United States Patent [19]
Majid et al.

[11] Patent Number: 5,784,231
[45] Date of Patent: Jul. 21, 1998

[54] OVERVOLTAGE PROTECTION FOR SMPS BASED ON DEMAGNETIZATION SIGNAL

[75] Inventors: Naveed Majid, Mohegan Lake, N.Y.; Bram Melse, Arnhem; Erwin Seinen, Malden, both of Netherlands

[73] Assignee: Philips Electronics North America Corp., New York, N.Y.

[21] Appl. No.: 845,745

[22] Filed: Apr. 25, 1997

[51] Int. Cl.$^6$ ....................................... H02H 7/00
[52] U.S. Cl. .................. 361/18; 361/86; 361/91; 363/21; 363/97
[58] Field of Search .................. 361/18, 86, 91; 363/21, 97

[56] References Cited

U.S. PATENT DOCUMENTS

| | | | |
|---|---|---|---|
| 4,447,841 | 5/1984 | Kent | 361/18 |
| 5,014,178 | 5/1991 | Balakrishnan | 363/49 |
| 5,083,254 | 1/1992 | Feldtkeller | 363/21 |
| 5,282,107 | 1/1994 | Balakrishnan | 361/18 |
| 5,285,367 | 2/1994 | Keller | 363/21 |
| 5,313,381 | 5/1994 | Balakrishnan | 363/147 |

*Primary Examiner*—Brian K. Young
*Assistant Examiner*—Michael J. Sherry
*Attorney, Agent, or Firm*—Robert M. McDermott

[57] ABSTRACT

An overvoltage protection circuit is provided for a switched-mode power supply of the type having a transformer with a primary winding, an auxiliary winding, and a secondary winding, with a switching transistor coupled in series with the primary winding. The overvoltage protection circuit includes a sensing resistor having a first terminal directly connected to the auxiliary winding for generating a current proportional to the voltage across the auxiliary winding, with a second terminal of this resistor being coupled to an input of a current mirror. The reflected current output of the current mirror is compared to an overvoltage reference current generated by an overvoltage reference current source by means of a current comparator, and a circuit is provided to generate a signal to turn off the switching transistor when the reflected current exceeds the overvoltage reference current. Such an overvoltage protection circuit provides fast, efficient and accurate overvoltage protection for the switched-mode power supply.

7 Claims, 1 Drawing Sheet

OVERVOLTAGE PROTECTION FOR SMPS BASED ON DEMAGNETIZATION SIGNAL

BACKGROUND OF THE INVENTION

The invention is in the field of power supply protection circuits, and relates more particularly to an overvoltage protection circuit for a switched-mode power supply.

Switched-mode power supplies are well known in the art, and are typically used to obtain good regulation (due to switched feedback) as well as efficient and economical filtering, since smaller-value filtering components can be used because of the typically higher operating frequency of the switched-mode supply.

In switched-mode power supplies, it is desirable to provide overvoltage protection to prevent the power supply output from exceeding a predetermined maximum value, thus preventing circuit malfunction and possible damage to circuitry powered by the switched-mode power supply.

In prior-art overvoltage protection circuits, such as the overvoltage protection circuit incorporated into the Motorola MC44603 power supply controller IC and illustrated in FIG. 44 on page 22 of the Motorola Technical Data Sheet for this device, a filtered DC voltage ($V_{CC}$) is sensed by a resistive divider, then compared to a voltage reference level by a voltage comparator, the output of which is fed to a circuit which generates a signal that serves to turn off a switching transistor within the switched-mode power supply, thus causing the output voltage to drop below the overvoltage protection level. A similar circuit is shown in FIG. 1 of U.S. Pat. No. 5,313,381.

A prior-art overvoltage protection circuit of this general type is shown in simplified form in FIG. 1. In FIG. 1, an overvoltage protection circuit 10 senses an auxiliary power supply voltage $V_{CC}$ which is generated from an AC voltage taken from an auxiliary winding 20 of a power supply transformer 21, which, in the simplified embodiment shown, is rectified by a diode 22 and filtered by a filter capacitor 24 to produce the voltage $V_{CC}$ at terminal 26. Voltage $V_{CC}$ is sensed by a resistive divider composed of resistors 28 and 30, with a scaled-down voltage proportional to $V_{CC}$ being coupled to the noninverting (+) input of a voltage comparator 32. The inverting (−) input of voltage comparator 32, at the terminal 34, is provided with a voltage reference signal $V_{REF}$. The output of voltage comparator 32, on line 36, is connected to the Set input (S) of a circuit, such as the latch circuit 38 shown here, for providing an overvoltage indicator signal $V_{OVP}$ at the output (Q) of the latch circuit at terminal 42. In order to restore the power supply circuit to its normal operating condition, a reset signal $V_{RESET}$ is applied to Reset (R) terminal 40 of the latch circuit 38.

The prior-art circuit of FIG. 1 operates by sensing the rectified, filtered voltage $V_{CC}$, stepping this voltage down using a resistive voltage divider composed of resistors 28 and 30, and feeding this stepped-down voltage to the noninverting input of comparator 32. The inverting input 34 of the comparator is provided with a voltage reference signal $V_{REF}$, with the attenuation ratio of the resistive voltage divider and the value of the $V_{REF}$ selected such that the comparator output 36 trips at a voltage which exceeds the nominal value of $V_{CC}$ by a selected amount. When the comparator 32 trips, latch 38 is set and an overvoltage protection signal $V_{OVP}$ is generated on terminal 42. This signal is provided to a switching transistor (such as transistor 40 in FIG. 1 of U.S. Pat. No. 5,313,381) which is coupled in series with the primary winding of the switched-mode power supply transformer to inhibit switching and thereby reduce the output voltage of the power supply. When the power supply output returns to an acceptable level, latch 38 is reset by a signal $V_{RESET}$ at reset terminal 40 and the circuit returns to its normal mode of operation.

Although the circuit of FIG. 1 provides adequate overvoltage protection, it suffers from several drawbacks. Since this overvoltage protection circuit senses the voltage across capacitor 24, typically a large capacitor which will charge and discharge relatively slowly, the overvoltage protection circuit will inherently be slow to recognize an overvoltage condition due to increased transformer voltage. Additionally, since $V_{CC}$ can vary by as much as 30 percent from its nominal value due to such factors as transformer winding ratio tolerances, the voltage fed to the noninverting input of voltage comparator 32, which is a scaled-down version of $V_{CC}$, can have a similar percentage variation, thus rendering the circuit relatively inaccurate.

Accordingly, it would be desirable to have an overvoltage protection circuit for a switched-mode power supply which is both faster and more accurate than existing overvoltage protection circuits.

SUMMARY OF THE INVENTION

It is therefor an object of the invention to provide an overvoltage protection circuit for a switched-mode power supply which is capable of operating faster than prior-art circuits and which also offers improved accuracy with respect to prior-art circuits.

In accordance with the invention, these objects are achieved by a new overvoltage protection circuit for a switched-mode power supply in which a sensing resistor is provided having a first terminal directly connected to the auxiliary winding for generating a current proportional to the voltage across the auxiliary winding, with a second terminal of the sensing resistor being coupled to an input of a current mirror. The reflected current output of the current mirror is compared to an overvoltage reference current generated by an overvoltage reference current source by means of current comparator, with a circuit being provided to generate a signal to turn off a switching transistor within the switched-mode power supply when the reflected current exceeds the overvoltage reference current.

In a preferred embodiment of the invention, the sensing resistor is a variable resistor, so that current generated therein can be adjusted to compensate for variations due to such factors as transformer winding ratio tolerances.

In a further preferred embodiment of the invention, the current mirror is provided with a delay circuit so that the overvoltage protection circuit will not be overly sensitive to a highly transient overvoltage condition.

In yet a further preferred embodiment of the invention, the overvoltage reference current source provides an overvoltage reference current which exceeds a nominal current in the sensing resistor by a selected percentage which is approximately equal to the percentage above a nominal voltage of the switched-mode power supply at which the switching transistor is to be turned off.

An overvoltage protection circuit in accordance with the present invention offers a significant improvement in that faster, more efficient and more accurate overvoltage protection is provided for the switched-mode power supply in which such an overvoltage protection circuit is provided.

These and other aspects of the invention will be apparent from and elucidated with reference to the embodiments described hereinafter.

3

BRIEF DESCRIPTION OF THE DRAWING

The invention may be more completely understood with reference to the following description, to be read in conjunction with the accompanying drawing, in which.

In the drawing, like components are generally designated by like reference numerals.

DESCRIPTION OF THE PREFERRED EMBODIMENTS

Figure 1:
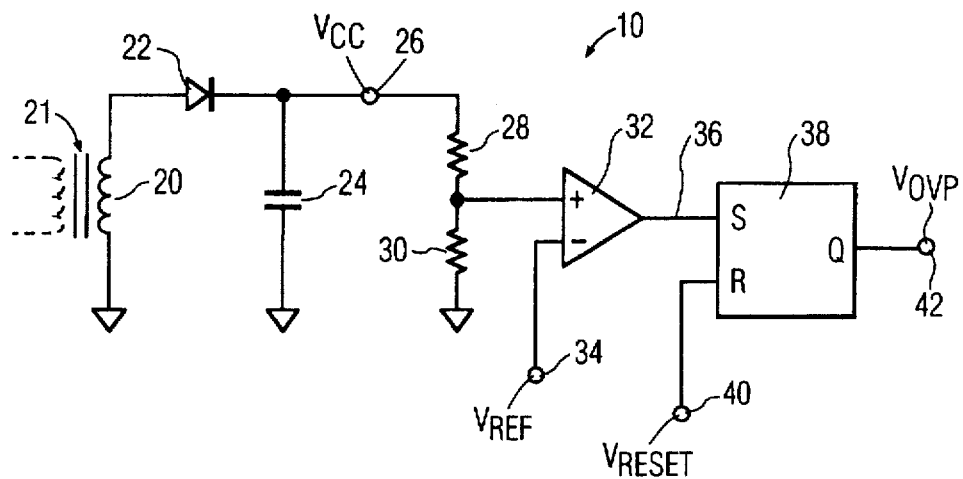
FIG. 1 shows a simplified schematic diagram of a prior-art overvoltage protection circuit.

FIG. 1 shows a simplified schematic diagram of a typical prior-art overvoltage protection circuit, as described above. Since this circuit operates by sensing the rectified, filtered voltage on capacitor 24, circuit operation will inherently be slow, thus not affording optimum overvoltage protection and possibly resulting in circuit malfunction or even permanent damage to sensitive circuit components. Additionally, as noted above, since the voltage across capacitor 24 can vary substantially from its nominal value, the prior-art overvoltage protection circuit, which operates off a fixed-ratio scaled-down version of the capacitor voltage, can have a relatively inaccurate overvoltage trigger level.

Figure 2:
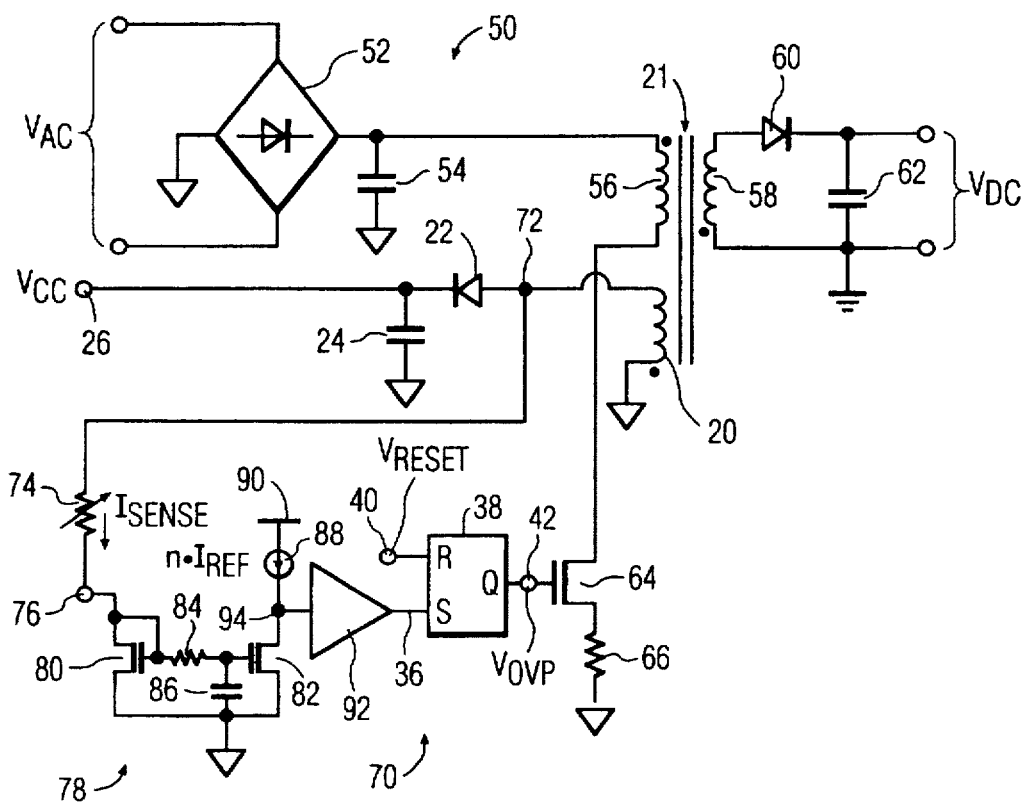
FIG. 2 shows a simplified schematic diagram of a switch-mode power supply incorporating an improved overvoltage protection circuit in accordance with the invention.

These disadvantages are overcome by the overvoltage protection circuit of the present invention, which is shown in a simplified switched-mode power supply 50 in FIG. 2. In the circuit of FIG. 2, an AC input voltage $V_{AC}$ is applied to a conventional diode bridge rectifier 52, the output of which is coupled to a filter capacitor 54 and a primary winding 56 of transformer 21. The primary winding 56 is coupled to ground through a switching transistor 64 and, optionally, a resistor 66. A secondary winding 58 of transformer 21 has its output coupled through a diode 60 to a filter capacitor 62, with the D.C. output voltage $V_{DC}$ of the circuit being taken across this capacitor. Auxiliary winding 20 of the transformer 21 is connected to diode 22 and filter capacitor 24 to generate a D.C. voltage $V_{CC}$ on terminal 26, which voltage can be used to power the control circuitry of the power supply. The portions of the circuit so far described are essentially similar to those of FIG. 1 of U.S. Pat. No. 5,313,381, in both configuration and operation, and accordingly will not be described in further detail.

Unlike the prior-art overall voltage protection circuits previously described, in the overvoltage protection circuit 70 of the present invention, as shown in FIG. 2, the protection circuit input is taken directly from the auxiliary winding 20 of the transformer 21, at junction 72, rather than from terminal 26, at which terminal the auxiliary winding output has been rectified and filtered. This input to the overvoltage protection circuit is coupled through a sensing resistor 74, here a variable resistor, to the input terminal 76 of a current mirror 78 in order to provide an input current $I_{SENSE}$ proportional to the voltage at junction 72 to the input terminal 76 of the current mirror 78. The current mirror 78 includes two MOSFET transistors 80 and 82 in a conventional current mirror configuration. The current mirror 78 may additionally include a delay circuit, in the form of an RC filter composed of resistor 84 and capacitor 86, which may optionally be included for the purpose of avoiding a false overvoltage protection circuit trigger condition due to a transient noise signal of short duration. In practice, the values of resistor 84 and capacitor 86 may be selected in a known manner to provide a delay of about 500 nanoseconds.

4

The output of current mirror 78 is connected to a current source 88, which is coupled to a power line 90 and which provides a current of n•$I_{REF}$. A current comparator 92 has an input coupled to the junction 94 between current source 88 and transistor 82 of the current mirror 78, so that the current comparator changes state and provides a Set (S) input to the latch 38 on line 36 when the current in current mirror transistor 82 exceeds the value n•$I_{REF}$ of the current source 88. This in turn will generate an overvoltage protection circuit output signal $V_{OVP}$ from the Q output of the latch 38 at terminal 42, thus disabling switching transistor 64 and reducing the overvoltage condition. When the overvoltage condition ceases, the latch 38 is reset by a signal $V_{RESET}$ at Reset (R) input 40 of the latch, in the same manner as the prior-art circuit of FIG. 1.

The current source 88 provides a current of n•$I_{REF}$, where $I_{REF}$ is a selected reference current value, with resistor 74 being set such that $I_{SENSE}$ is equal to $I_{REF}$ when the voltage at junction 72 is equal to its nominal operating value. Since current mirror 78 is selected to have a 1:1 current ratio, the current in MOSFET 82 will be equal to $I_{SENSE}$, which in the nominal case is equal to $I_{REF}$. Thus, by selecting the parameter n to be equal to a value at which overvoltage detection and protection is to occur, a desired overvoltage protection level can be achieved. Thus, for example, if n is set equal to 1.26, the overvoltage protection circuit will trigger when the voltage level at junction 72 (which is proportional to the output voltage $V_{DC}$) rises above its nominal value by 26 percent. The current source 88, shown schematically in FIG. 2 by a current-source symbol, may be implemented by conventional means, such as a current mirror having its input connected to a source of reference current $I_{REF}$, and a current mirror ratio of 1:n.

In operation, the resistance of variable resistor 74 will set such that $I_{SENSE}$ is equal to $I_{REF}$ under nominal operating conditions. This initial adjustment not only sets the nominal operating conditions of the circuit, but also serves to compensate for voltage variations in a particular circuit due to component tolerances, such as the tolerances in the transformer winding ratios, which can vary by as much as 30 percent, thus causing similar variations in voltages among circuits having nominally identical circuit configurations. In this manner, the drawback of prior-art circuits, such as the one shown in FIG. 1, that voltage variations due to component tolerances can lead to substantial variations in the level of overvoltage that will trigger the overvoltage protection circuit, is eliminated. Additionally, since the input to the overvoltage protection circuit of the invention is taken directly from a transformer winding, at junction 72, rather than from across capacitor 24 as in the prior-art, an overvoltage condition can be detected much more rapidly, since the substantial time delay necessary to charge the capacitor 24 has been eliminated. Thus, overvoltage protection circuits in accordance with the present invention are both faster and more accurate than prior-art circuits.

While the invention has been particularly shown and described with reference to several preferred embodiments thereof, it will be understood by those skilled in the art that various changes in form and detail may be made without departing from the spirit or scope of the invention.

What is claimed is:

1. An overvoltage protection circuit, for a switched-mode power supply of the type having a transformer with a primary winding, an auxiliary winding, and a secondary winding, and a switching transistor coupled in series with the primary winding, characterized in that the overvoltage protection circuit comprises a sensing resistor having a first terminal directly connected to said auxiliary winding for generating a current in said sensing resistor proportional to the voltage across said auxiliary winding and a second terminal, a current mirror, said second resistor terminal being coupled to an input of said current mirror, an overvoltage reference current source coupled to an output of said current mirror, a current comparator for comparing a reflected current from said current mirror proportional to said sensing current in said resistor to an overvoltage reference current generated by said overvoltage reference current source, and circuit means for generating a signal to turn off said switching transistor when said reflected current exceeds said overvoltage reference current.

2. An overvoltage protection circuit as in claim 1, characterized in that said sensing resistor comprises a variable resistor.

3. An overvoltage protection circuit as in claim 1, characterized in that said current mirror comprises a delay circuit.

4. An overvoltage protection circuit as in claim 3, wherein said delay circuit has a time delay of about 500 ms.

5. An overvoltage protection circuit as in claim 1, characterized in that said means for generating a signal to turn off said switching transistor comprises a latch circuit.

6. An overvoltage protection circuit as in claim 1, characterized in that said overvoltage reference current source provides an overvoltage reference current which exceeds a nominal current in said sensing resistor by a selected percentage approximately equal to the percentage above a nominal voltage of said switched-mode power supply at which said switching transistor is to be turned off.

7. An overvoltage protection circuit as in claim 6, wherein said selected percentage is about 26 percent.

* * * * *